(12) United States Patent
Yokota

(10) Patent No.: US 8,988,861 B2
(45) Date of Patent: Mar. 24, 2015

(54) POWER CONVERTER

(75) Inventor: Akio Yokota, Takahama (JP)

(73) Assignee: Denso Corporation, Kariya (JP)

( * ) Notice: Subject to any disclaimer, the term of this patent is extended or adjusted under 35 U.S.C. 154(b) by 154 days.

(21) Appl. No.: 13/558,863

(22) Filed: Jul. 26, 2012

(65) Prior Publication Data

US 2013/0028001 A1    Jan. 31, 2013

(30) Foreign Application Priority Data

Jul. 26, 2011 (JP) ................................ 2011-163007
Mar. 9, 2012 (JP) ................................ 2012-052396

(51) Int. Cl.
*H02M 1/00* (2006.01)
*H02M 7/00* (2006.01)
*H02M 7/48* (2006.01)
*H01H 33/32* (2006.01)

(52) U.S. Cl.
CPC .................................... *H02M 7/003* (2013.01)
USPC ........... 361/624; 361/614; 361/623; 361/715; 361/717; 361/728; 363/131; 363/141; 363/144; 363/17; 363/37; 320/116; 320/119; 320/120

(58) Field of Classification Search
USPC ....................... 361/601–640, 36, 38, 67, 657, 361/715–727; 363/34–37, 50–56, 65–72, 363/95, 98, 131, 141–144; 318/376, 440; 307/9.1, 10.1, 10.6, 10.7, 17, 45, 46, 307/82, 83, 125; 320/116, 119, 120
See application file for complete search history.

(56) References Cited

U.S. PATENT DOCUMENTS

| 4,908,738 | A | * | 3/1990 | Kobari et al. ................. 361/829 |
| 5,172,310 | A | * | 12/1992 | Deam et al. .................. 363/144 |
| 5,414,609 | A | * | 5/1995 | Levran et al. .................. 363/17 |
| 5,675,223 | A | * | 10/1997 | Yoshizawa et al. ........... 318/139 |

(Continued)

FOREIGN PATENT DOCUMENTS

| CN | 101110554 | 1/2008 |
| JP | 2000-78855 | 3/2000 |

(Continued)

OTHER PUBLICATIONS

Office Action (7 pages) dated Apr. 23, 2014, issued in corresponding Chinese Application No. 201210262847.8 and English translation (10 pages).

*Primary Examiner* — Michail V Datskovskiy
(74) *Attorney, Agent, or Firm* — Nixon & Vanderhye P.C.

(57) ABSTRACT

The power converter includes a power conversion section which configures a circuit for power conversion, a power bus bar extending from the power conversion section, a terminal block, and a current sensor measuring current flowing in the power bus bar. The terminal block includes a mounting surface to which a terminal portion of the power bus bar is mounted. The mounting surface faces a direction substantially perpendicular to an arrangement direction in which the power conversion section and the terminal block are arranged. The current sensor is located at a side of a bottom surface on the opposite side of the mounting surface in the terminal block. The power bus bar includes: a sensor-surrounded portion surrounded by the current sensor; and an outer surface faced portion located between the sensor-surrounded portion and the terminal portion along an outer surface on the opposite side of the power conversion section.

12 Claims, 7 Drawing Sheets

(56) References Cited

U.S. PATENT DOCUMENTS

| | | | |
|---|---|---|---|
| 5,982,645 A * | 11/1999 | Levran et al. | 363/37 |
| 6,212,087 B1 * | 4/2001 | Grant et al. | 363/144 |
| 6,434,008 B1 * | 8/2002 | Yamada et al. | 361/728 |
| 6,978,501 B2 * | 12/2005 | Vrzalik | 5/624 |
| 8,035,040 B2 * | 10/2011 | Nishikawa | 174/541 |
| 8,422,222 B2 * | 4/2013 | Noda | 361/689 |
| 2001/0012212 A1 * | 8/2001 | Ikeda | 363/141 |
| 2006/0062023 A1 * | 3/2006 | Patwardhan et al. | 363/15 |
| 2006/0086981 A1 * | 4/2006 | Yamaguchi et al. | 257/347 |
| 2006/0119343 A1 * | 6/2006 | Saito et al. | 324/117 H |
| 2006/0120001 A1 * | 6/2006 | Weber et al. | 361/103 |
| 2007/0015384 A1 * | 1/2007 | Asao | 439/76.2 |
| 2007/0200551 A1 * | 8/2007 | Muraki et al. | 324/127 |
| 2007/0257659 A1 * | 11/2007 | Nomoto et al. | 324/76.11 |
| 2007/0285864 A1 * | 12/2007 | Yoshida et al. | 361/93.1 |
| 2008/0049477 A1 * | 2/2008 | Fujino et al. | 363/131 |
| 2009/0023345 A1 | 1/2009 | Matsumoto et al. | |
| 2011/0069466 A1 * | 3/2011 | Herron et al. | 361/803 |
| 2011/0194247 A1 * | 8/2011 | Nakasaka et al. | 361/689 |
| 2011/0194248 A1 * | 8/2011 | Nakasaka et al. | 361/689 |
| 2011/0194249 A1 * | 8/2011 | Nakasaka et al. | 361/689 |
| 2011/0205724 A1 * | 8/2011 | Nakajima et al. | 361/809 |
| 2011/0310585 A1 * | 12/2011 | Suwa et al. | 361/820 |
| 2012/0176749 A1 * | 7/2012 | Arisawa et al. | 361/728 |
| 2013/0021749 A1 * | 1/2013 | Nakajima | 361/689 |
| 2013/0265724 A1 * | 10/2013 | Kaneko et al. | 361/715 |

FOREIGN PATENT DOCUMENTS

| | | |
|---|---|---|
| JP | 2004-327184 | 11/2004 |
| JP | 2006-081373 | 3/2006 |
| JP | 2006-295997 | 10/2006 |
| JP | 2007-166803 | 6/2007 |
| JP | 2007-306671 | 11/2007 |
| JP | 2008-245461 | 10/2008 |
| JP | 2008-253056 | 10/2008 |
| JP | 2009-512982 | 3/2009 |
| JP | 2009-159767 | 7/2009 |
| JP | 2010-4707 | 1/2010 |
| JP | 2010-033845 | 2/2010 |
| JP | 2011-081990 | 4/2011 |

* cited by examiner

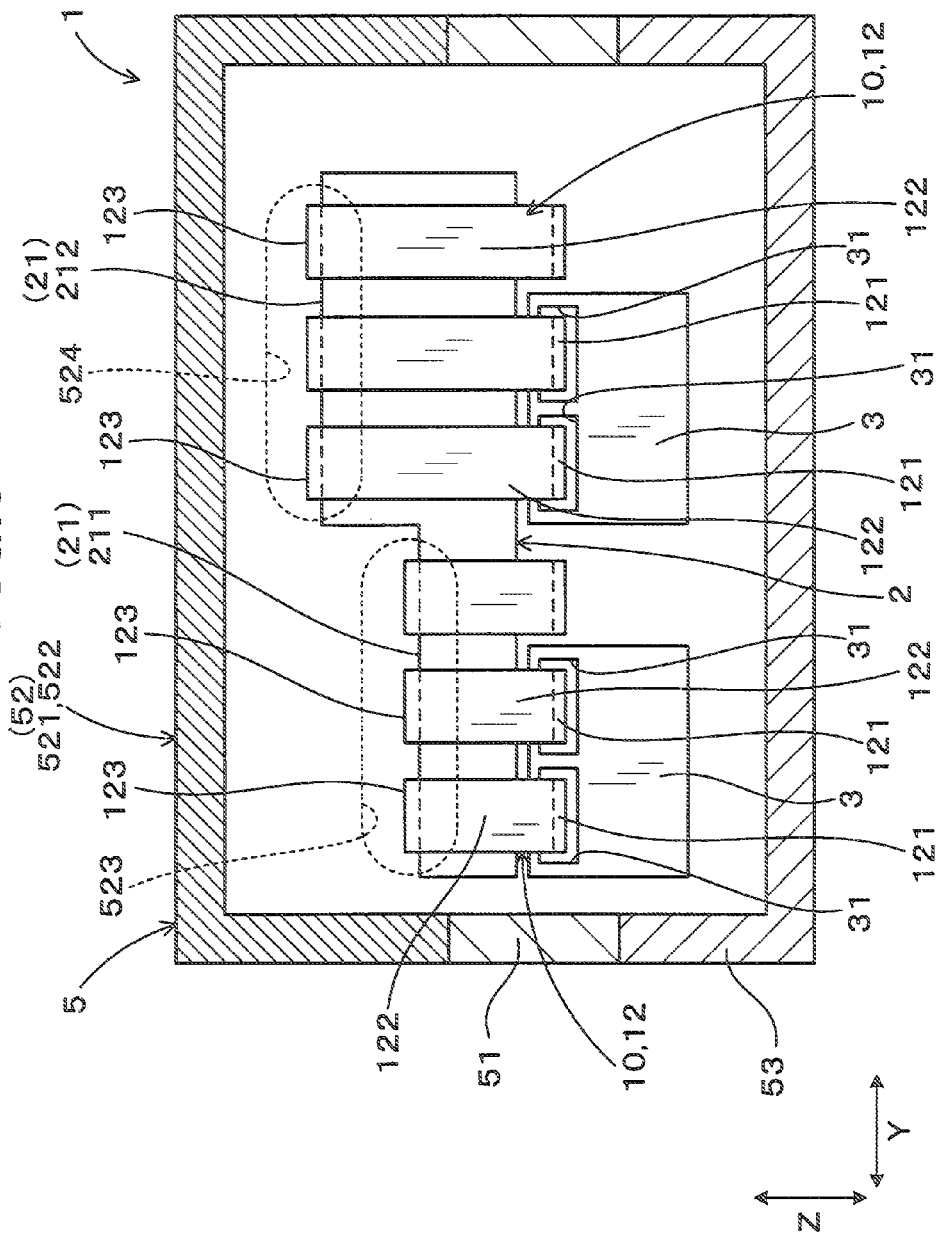

POWER CONVERTER

CROSS-REFERENCE TO RELATED APPLICATION

This application is based on and claims the benefit of priority from earlier Japanese Patent Application Nos. 2011-163007 filed Jul. 26, 2011 and 2012-052396 filed Mar. 9, 2012, the descriptions of which are incorporated herein by reference.

BACKGROUND OF THE INVENTION

1. Field of the Invention

The present invention relates to a power converter including a current sensor and a terminal block.

2. Description of the Related Art

As related art of a power converter which performs power conversion between direct current (DC) power and alternating current (AC) power, a power converter described in JP-A-2009-159767 has been known. FIG. 7 shows this power converter.

As shown in FIG. 7, a power converter 1 includes a power conversion section 95 and a power bus bar 91. The power conversion section 95 has a semiconductor laminated unit and a capacitor 952, where the semiconductor laminated unit 951 is formed by laminating a plurality of semiconductor modules and cooling sections. The power bus bar 91 is electrically connected to a main electrode terminal of the power conversion section 95. This power bus bar 91 is extended from the power conversion section 95 in such a direction that a terminal block 93 is provided.

A terminal portion 92 in which a press-fit nut 921 is fixed is provided on the tip end of the power bus bar 91. The terminal portion 92 is installed in the terminal block 93. This terminal portion 92 is designed so as to be connected to an external terminal of an external device on the terminal block 93.

As shown in FIG. 7, the power converter 9 may further include a current sensor 94 that measures current that flows in the power bus bar 91, in order to improve control accuracy of a power conversion circuit configured by the power conversion section 95.

This current sensor 94 is located around the power bus bar 91. That is, the current sensor 94 is located between the power conversion section 95 and the terminal block 93 in such an extension direction that the power bus bar 91 is extended from the power conversion section 95 to the terminal block 93. Under this condition, a space for arrangement of the current sensor 94 is secured in a case of the power converter 9.

However, the power converter 9 as described above has the following issues.

The current sensor 94 is mounted in the power converter 9. Due to this, the power conversion section 95, the terminal block 93, and the current sensor 94 are arranged in a such a direction that the power bus bar 91 is extended from the power conversion section 95 to the terminal block 93. In this direction, a size of the power converter 9 increases depending on the space for layout of the current sensor 94. That is, a body of the power converter 9 is enlarged in a particular direction. This makes it difficult to downsize the power converter 9, thereby reducing the degree of freedom of equipment layout of the power converter 9.

For example, the power converter 9 is mounted in e.g., an engine compartment of vehicles such as electric vehicles or hybrid vehicles along with other equipment. Thus, there is a limit to the space available for mounting the power converter 9, in connection with layout of other peripheral equipment. Therefore, an enlargement of a body of the power converter 9 in a particular direction adversely impacts mountability on, e.g., vehicle.

SUMMARY

The present disclosure provides a power converter which is able to be easily downsized.

According to an exemplary aspect of the present disclosure, there is provided a power converter, comprising: a power conversion section that includes a circuit for power conversion; a power bus bar that extends from the power conversion section; a terminal block that is located at the side in which the power bus bar is extended from the power conversion section, the terminal block including a mounting surface to which a terminal portion of the power bus bar is mounted; and a current sensor that measures current flowing in the power bus bar. The mounting surface faces a direction substantially perpendicular to an arrangement direction in which the power conversion section and the terminal block are arranged. The current sensor is located at a side of a bottom surface which is a surface on the opposite side of the mounting surface in the terminal block. The power bus bar includes a sensor-surrounded portion which is surrounded by the current sensor, and an outer surface faced portion which is located between the sensor-surrounded portion and the terminal portion along an outer surface on the opposite side of the power conversion section.

According to the exemplary aspect, the current sensor is located at the side of the bottom surface which is a surface on the opposite side of the mounting surface in the terminal block. That is, the current sensor and the terminal block are arranged side by side in a direction substantially perpendicular to the mounting surface.

Therefore, in order to mount the current sensor in the power converter, there is no need to increase a size of the power converter with respect to a direction in which the power conversion section and the current sensor are arranged. This can prevent a body of the power converter from being enlarged in a particular direction. Accordingly, even though the current sensor is mounted in the power converter, the power converter can be downsized, thereby improving the degree of freedom of equipment layout of the power converter.

Further, the power bus bar is configured by the terminal portion, the sensor-surrounded portion, and the outer surface faced portion as formed above. This can prevent the power bus bar from being enlarged in a direction in which the power conversion section and the terminal block are arranged. Due to this, the power bus bar can be assembled in the power converter, without enlarging a body of the power converter in a particular direction.

As described above, the exemplary aspect can provide the power converter which is able to be easily downsized.

BRIEF DESCRIPTION OF THE DRAWINGS

In the accompanying drawings:

FIG. 3 is a cross-sectional view taken from line III-III of FIG. 2 which shows a terminal block of the power converter;

DETAILED DESCRIPTION OF THE PREFERRED EMBODIMENTS

Hereinafter, a power converter according to an exemplary embodiment of the present invention will be described with reference to the drawings

First Embodiment

FIGS. 1 to 4 show a power converter 1 according to a first embodiment.

Figure 1:
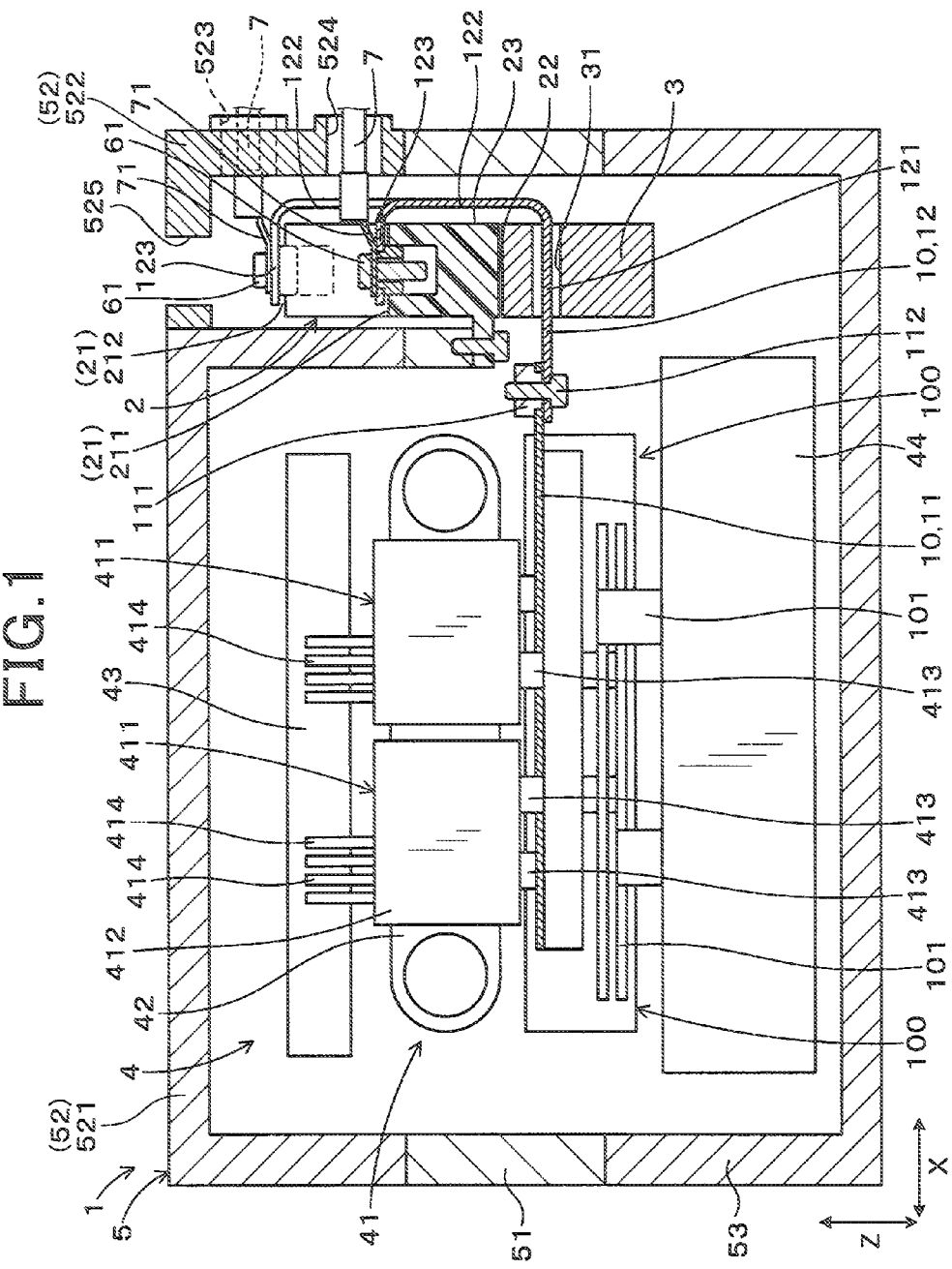
FIG. 1 is a cross-sectional view showing a power converter according to a first embodiment of the present invention.

As shown in FIG. 1, the power converter 1 includes a power conversion section 4 and a power bus bar 10. The power conversion section 4 configures a power conversion circuit. The power bus bar 10 is extended from the power conversion section 4.

The power converter 1 further includes a terminal block 2 and a current sensor 3. The terminal block 2 is located at a side in which the power bus bar 10 is extended from the power conversion section 4. The terminal block 2 has a mounting surface 21 which mounts a terminal portion 123 of the power bus bar 10 thereon. The mounting surface 21 includes a first mounting surface 211 and a second mounting surface 212, and faces a direction substantially perpendicular to an arrangement direction in which the power conversion section 4 and the terminal block 2 are arranged. The current sensor 3 measures current which flows in the power bus bar 10.

The power bus bar 10 includes a sensor-surrounded portion 121 and an outer surface faced portion 122. The sensor-surrounded portion 121 is surrounded by the current sensor 3. The outer surface faced portion 122 is located between the sensor-surrounded portion 121 and the terminal portion 123 along an outer surface 23 on an opposite side of the power conversion section 4. The current sensor 3 is located at a side of a bottom surface 22 which corresponds to a surface on an opposite side of the first mounting surface 211 and the second mounting surface 212 in the terminal block 2.

Hereinafter, the power converter 1 is described in detail below.

The power converter 1 according to the present embodiment is designed to be connected to a three-phase alternating current (AC) rotating electrical machine (not shown) which is used for electric vehicles or hybrid vehicles. Specifically, the power converter 1 is connected to two three-phase AC rotating electrical machines.

Figure 2:
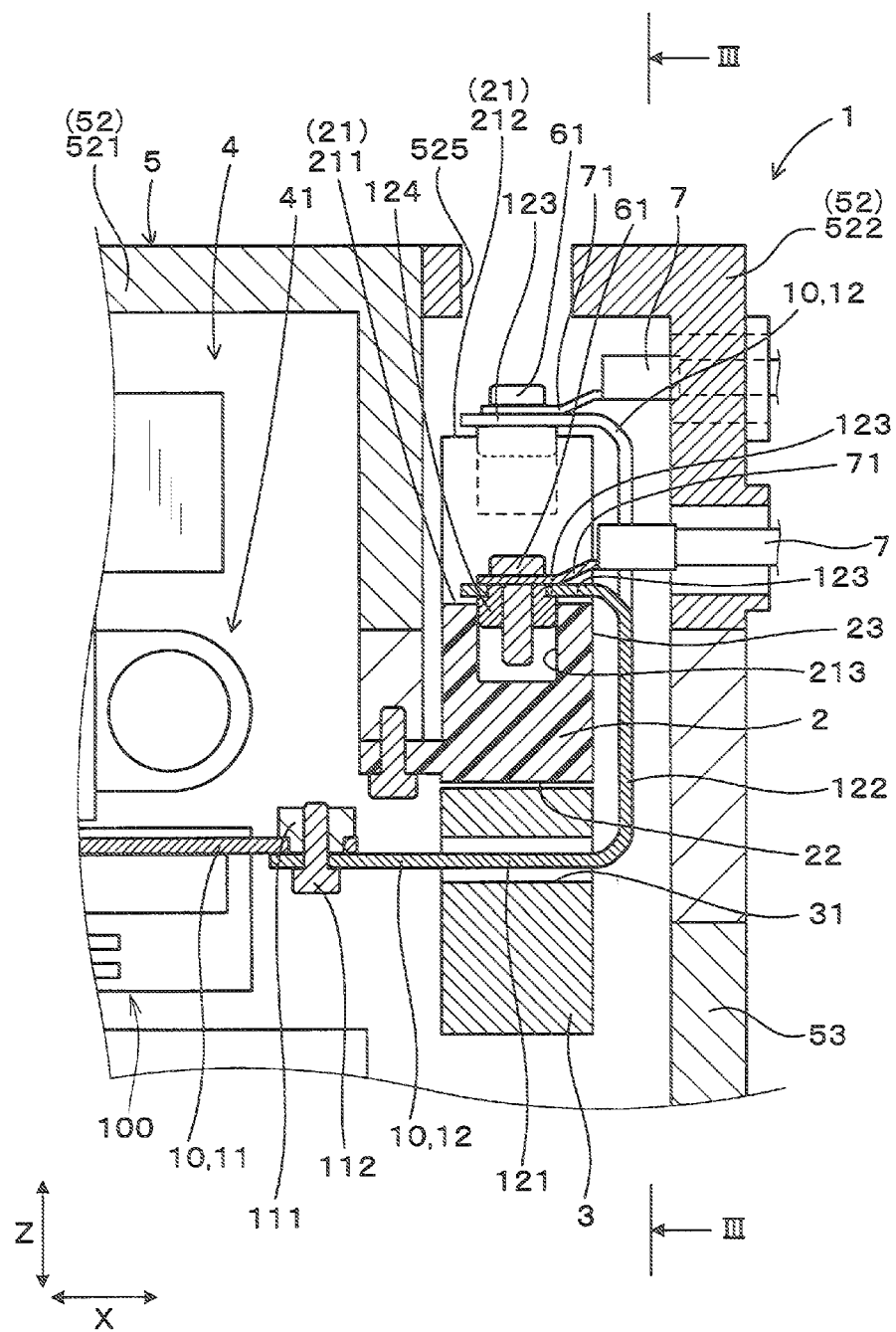
FIG. 2 is an enlarged partial cross-sectional view showing the power converter of FIG. 1.

As shown in FIGS. 1 and 2, the power converter 1 includes the power conversion section 4, the power bus bar 10, the terminal block 2, and the current sensor 3. The power conversion section 4 configures a power conversion circuit. The power bus bar 10 is extended from the power conversion section 4. The terminal block 2 has the first mounting surface 211 and the second mounting surface 212 which mount the terminal portion 123 of the power bus bar 10 thereon. The current sensor 3 measures current which flows in the power bus bar 10.

As shown in FIG. 1, the power conversion section 4 includes a semiconductor laminated unit 41, a control circuit board 43, and a smoothing capacitor 44. The semiconductor laminated unit 41 has a plurality of semiconductor modules 411. The control circuit board 43 is connected to a control terminal 414 of the respective semiconductor modules 411. The control circuit board 43 and the smoothing capacitor 44 are positioned on opposite sides to each other with respect to the semiconductor laminated unit 41.

In the present embodiment, a side in which the control circuit board 43 is located with respect to the semiconductor laminated unit 41 is referred to as an "upper side", a side in which the smoothing capacitor 44 is located with respect to the semiconductor laminated unit 41 is referred to as an "lower side", a direction connecting the upper and lower sides is referred to as a "height direction Z (corresponding to a Z-axis shown in the drawings)". When the power converter 1 is mounted in an engine compartment in a vehicle, the upper side faces vertically upward. However, a power converter according to the present invention is not limited to this power converter 1.

The semiconductor laminated unit 41 includes the plurality of semiconductor modules 411 and a plurality of cooling pipes 42. The plurality of semiconductor modules 411 configure a part of a power conversion circuit. The plurality of cooling pipes 42 cool the plurality of semiconductor modules 411 from both principal surface thereof.

The semiconductor module 411 is configured by incorporating switching elements, for example, IGBTs (insulated gate bipolar transistors) or MOSFETs (metal-oxide-semiconductor field-effect transistors), therein. The semiconductor module 411 includes a flat plate-like main body portion 412, a main electrode terminal 413 and a control terminal 414.

The main body portion 412 is formed by resin-molded switching elements. The main electrode terminal 413 and the control terminal 414 project from an end surface of the main body portion 412 in opposite directions to each other. The main electrode terminals 413 is configured by two main electrode terminals that project downward in the height direction Z (see FIG. 1). The control terminal 414 is configured by a plurality of control terminals that project upward in the height direction Z. The two main electrode terminals 413 are connected to the power bus bar 10. The control terminal 414 is connected to the control circuit board and receives control current for controlling the switching elements.

As shown in FIG. 1, the power bus bar 10 includes a mold-side power bus bar 11, a capacitor-side power bus bar 101, and a terminal-side power bus bar 12. The mold-side power bus bar 11 and the capacitor-side power bus bar 101 configure a bus bar assembly 100. The terminal-side power bus bar 12 is coupled to the mold-side power bus bar 11.

The mold-side power bus bar 11 is connected to one of the two main electrode terminals 413 of the semiconductor module 411 and is located in such a manner that the mold-side power bus bar 11 extends in an extrusion direction X (corresponding to X-axis shown in the drawings) perpendicular to both of the height direction Z and a lamination direction Y (corresponding to Y-axis shown in the drawings) (see FIGS. 1 and 2).

As shown in FIG. 1, the capacitor-side power bus bar 101 connects the other of the two main electrode terminals 413 of the semiconductor module 411 and the smoothing capacitor 44.

The capacitor-side power bus bar 101 and the mold-side power bus bar 11 configure a bus bar assembly 100 which is integrated by resin molding.

As shown in FIG. 2, in a connection portion of the mold-side power bus bar 11 to the terminal-side power bus bar 12, a press-fit nut 111 is press-fitted. A connection bolt is screwed into the press-fit nut 111 so that the mold-side power bus bar 11 and the terminal power bus bar 12 can be fixed to each other.

As shown in FIGS. 1 and 2, the terminal-side power bus bar 12 includes the terminal portion 123, the sensor-surrounded portion 121, and the outer surface faced portion 122. The terminal portion 123 is mounted in the terminal block 2 and configures input and output terminals. The sensor-surrounded portion 121 is surrounded by the current sensor 3. The outer surface faced portion 122 is located between the sensor-surrounded portion 121 and the terminal portion 123 along the outer surface 23 on the opposite side of the power conversion section 4.

From both ends of the outer surface faced portion 122 to the side of the power conversion section 4, the terminal portion 123 and the sensor-surrounded portion 121 are bent at a substantially right angle to be vertically arranged so that the terminal-side power bus bar 12 forms a substantially U-like shape.

As shown in FIG. 2, a press-fit nut 124 is press-fitted in a through hole which is formed in the terminal portion 123. A plurality of wires 7 are connected to respective terminals of the three-phase AC rotating electrical machine. Each of the wires 7 has a wire-side terminal 71 in which a bolt through hole that is formed. A fixing bolt 61 is inserted in the bolt through hole and is engaged with the press-fit nut 124 so that the terminal portion 123 and the wire-side terminal 71 can be connected to each other.

As shown in FIGS. 1 and 2, in the sensor-surrounded portion 121, a bolt insertion hole is formed at an end portion located at the side of the power conversion section 4. A connection bolt 112 is inserted in this bolt insertion hole and is engaged with the press-fit nut 111 of the mold-side power bus bar 11 so that the mold-side power bus bar 11 and the terminal-side power bus bar 12 are coupled with each other.

As shown in FIGS. 1 to 3, the terminal-side bus bar 12 located in the first mounting surface 211 and the terminal-side bus bar 12 located in the second mounting surface 212 are different from each other in a length of the outer surface faced portion 122 in the height direction Z. The length of the outer surface faced portion 122 of the 1.5 respective terminal-side bus bar 12 is designed in such a manner that a height position of the terminal portion 123 corresponds to a height position of the first mounting surface 211 and a height position of the second mounting surface 212. Here, a "height position" corresponds to a vertical portion, i.e., a Z-axis position shown in the drawings.

As shown in FIGS. 1 and 2, the terminal block 2 is located inside the substantially U-like shaped terminal-side power bus bar 12. The terminal block 2 includes the first mounting surface 211, the second mounting surface 212, and outer surface 23 The terminal portion 123 of the terminal-side power bus bar 12 is mounted in the first mounting surface 211 and the second mounting surface 212. The outer surface 23 is located at the opposite side of the power conversion section 4, and faces the outer surface faced portion 122 of the terminal-side bus bar 12.

As shown in FIG. 3, the first mounting surface 211 and the second mounting surface 212, which are formed on the upper surface of the terminal block 2, are located adjacent to each other in the lamination direction Y. In the height direction Z, a height position of the first mounting surface 211 is set to be lower than that of the second mounting surface 212.

As described above, the power converter 1 of the present embodiment is configured to be connectable to the two three-phase AC rotating electrical machines. Since three electrodes, i.e., U-phase, V-phase, and W-phase electrodes are provided with the respective three-phase AC rotating electrical machines, six terminal-side power bus bars 12 are located in the terminal block 2. In three terminal-side power bus bars 12 corresponding to the three electrodes of the respective three-phase AC rotating electrical machines, the corresponding three terminal portions 123 are located in the first mounting surface 211 and the second mounting surface 212, respectively. In two adjacent terminal-side power bus bars 12 of the three terminal-side power bus bars 12, the corresponding two sensor-surrounded portions 121 are inserted in a bus bar insertion hole 31 which is formed in the current sensor 3.

A concave groove portion 213 is formed on the first mounting surface 211 and the second mounting surface 212 having a shape corresponding to an outer shape of the press-fit nut 124 located in the terminal portion 123. The press-fit nut 124 is fitted in the concave groove portion 213.

The current sensor 3 is located at a side of a bottom surface 22 which is a surface on the opposite side of the first mounting surface 211 and the second mounting surface 212 in the terminal block 2. The bus bar insertion hole 31 is formed in the current sensor 3. The sensor-surrounded portion 121 of the terminal-side bus bar 12 is inserted in the bus bar insertion hole 31.

The power conversion section 4, the power bus bar 10, the terminal block 2, and the current sensor 3, which are configured as described above, are held in a case 5. As shown in FIG. 1, the case 5 includes a case body 51, an upper cover 52, and a lower cover 53. The case body 51 is located so as to laterally surround the power conversion section 4, the power bus bar 10, and the current sensor 3 from all around. At the upper and lower sides of the case body 51, the corresponding opening portions are formed and covered by the upper cover 52 and the lower cover 53.

As shown in FIGS. 1 and 2, the upper cover 52 includes a conversion section side cover 521 and a terminal block side cover 522. The conversion section side cover 521 is located at the upper side of the power conversion section 4. The terminal block side cover 522 is located at the upper side of the terminal block.

In the terminal block side cover 522, a first connection port 523 and a second connection port 524 are formed. The first and second connection ports 523 and 524 are located in association with height positions of the first and second mounting surfaces 211 and 212. The wires 7 of the three-phase AC rotating electrical machine, which are connected to the terminal portions 123 that are located in the first and second mounting surface 211 and 212, are inserted inside the first and second connection ports 523 and 524, respectively.

A work opening portion 525, which is used for performing a fastening operation of the fixing bolt 61 that fastens the wire-side terminal 71 and the terminal portion 123, is formed at an upper position of the first and second mounting surfaces 211 and 212 in the terminal block side cover 522. In the present embodiment, the upper cover 52 is configured by two components, i.e., the conversion section side cover 521 and a terminal block side cover 522. However, the upper cover 52 is not limited to this configuration, but may be configured by, for example, one component.

First, the power conversion section 4, the power bus bar 10, the terminal block 2, and the current sensor 3, which configure the power converter 1, are fixed to the case body 51. Then, the conversion section side cover 521, the terminal block side cover 522, and the lower cover 53 are assembled in the case body 51 so that the opening portions formed at the upper and lower portions of the case body 51 are covered.

Next, operation of the power converter 1 shown in the present embodiment is described below.

In the power converter 1, the current sensor 3 is located at the side of the bottom surface 22 which is a surface on the opposite side of the first and second mounting surfaces 211 and 212 in the terminal block 2. That is, the current sensor 3 and the terminal block 2 are placed side by side in a direction perpendicular to the first and second mounting surfaces 211 and 212.

Therefore, in order to mount the current sensor 3 in the power converter 1, there is no need to increase a size of the power converter 1 with respect to a direction in which the power conversion section 4 and the current sensor 3 are arranged. This can prevent a body of the power converter 1 from being enlarged in a particular direction. Accordingly, even though the current sensor 3 is mounted in the power converter 1, the power converter 1 can be downsized, thereby improving degree of freedom of equipment layout of the power converter 1.

In addition, as described above, the current sensor 3 and the terminal block 2 are placed side by side in the direction perpendicular to the first and second mounting surfaces 211 and 212, thereby being able to place the first and second mounting surfaces 211 and 212 at a more outside position in the direction perpendicular to the first and second mounting surfaces 211 and 212 in the power converter 1. Thus, when the power converter 1 is mounted in a vehicle, the terminal portion 123 can be placed at a position nearer to an operator, thereby being able to improve workability on connecting the terminal portion 123 and the external device.

Further, the terminal-side power bus bar 12 is configured by the terminal portion 123, the sensor-surrounded portion 121, and the outer surface faced portion 122 as formed above. This can prevent the power bus bar 10 from being enlarged in an arrangement direction in which the power conversion section 4 and the terminal block 2 are arranged. Due to this, the power bus bar 10 can be assembled in the power converter 1, without enlarging a body of the power converter 1 in a particular direction.

In the power converter 1, the power bus bar 10 is configured to fix the press-fit nut 124 to a surface on the side of the terminal block 2 in the terminal portion 123. The concave groove portion 213, which has a shape corresponding to an outer shape of the press-fit nut 124, is formed on the upper surface of the terminal block 2. The press-fit nut 124 is fitted in the concave groove portion 213, so that the press-fit nut can be positioned. Thus, the terminal portion 123 to which the press-fit nut 124 is fixed can be positioned, thereby being able to improve workability on connecting the terminal portion 123 and the external device.

In addition, the terminal block 2 has the mounting surface 21 including the first and second mounting surfaces 211 and 212. The height position of the first mounting surface 211 in an arrangement direction, where the current sensor 3 and the terminal block 2 are arranged, is set to be lower than that of the second mounting surface 212. This can reduce a space for providing the plurality of wires 7 connected to the first and second mounting surfaces 211 and 212.

Figure 4A:
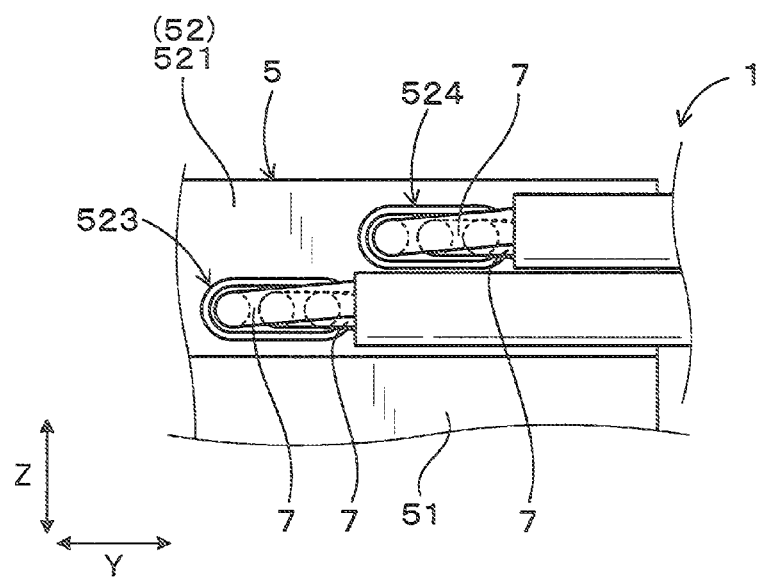
FIG. 4A is an elevation view showing a plurality of wires which are connected in the power converter according to the first embodiment.

That is, as shown in FIG. 4A, the height positions of the first and second mounting surfaces 211 and 212 are set as described above, and the first and second connection ports 523 and 524 are located at the corresponding height position, so that the plurality of wires 7, which are connected to the terminal portion 123 located in the respective mounting surfaces 211 and 212, can be arranged side by side in the height direction.

Figure 4B:
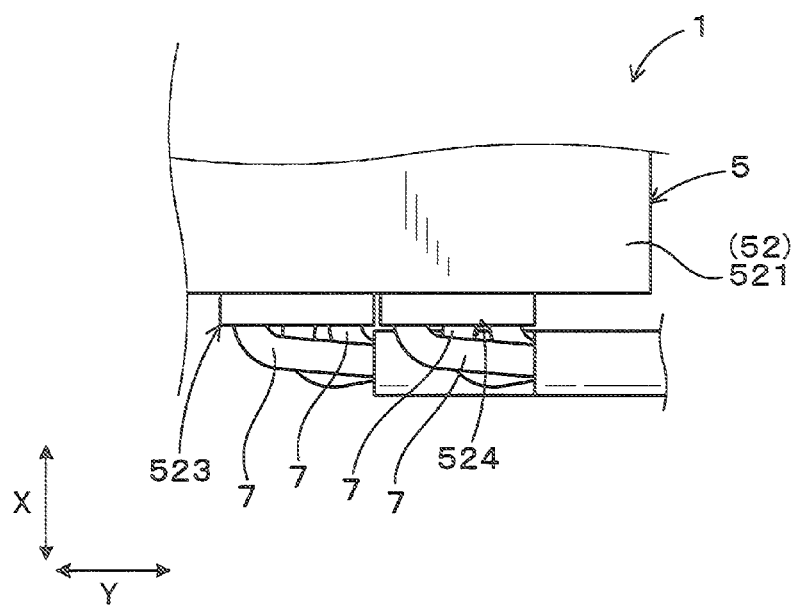
FIG. 4B is a side view showing a plurality of wires which are connected in the power converter according to the first embodiment.

Therefore, as shown in FIG. 4B, the plurality of wires 7 are not overlapped with each other, thereby being able to prevent the plurality of wires 7 from bulging outward. This can reduce a space for providing the plurality of wires 7.

As described above, the present embodiment can provide the power converter 1 which is able to be easily downsized.

Second Embodiment

Figure 5:
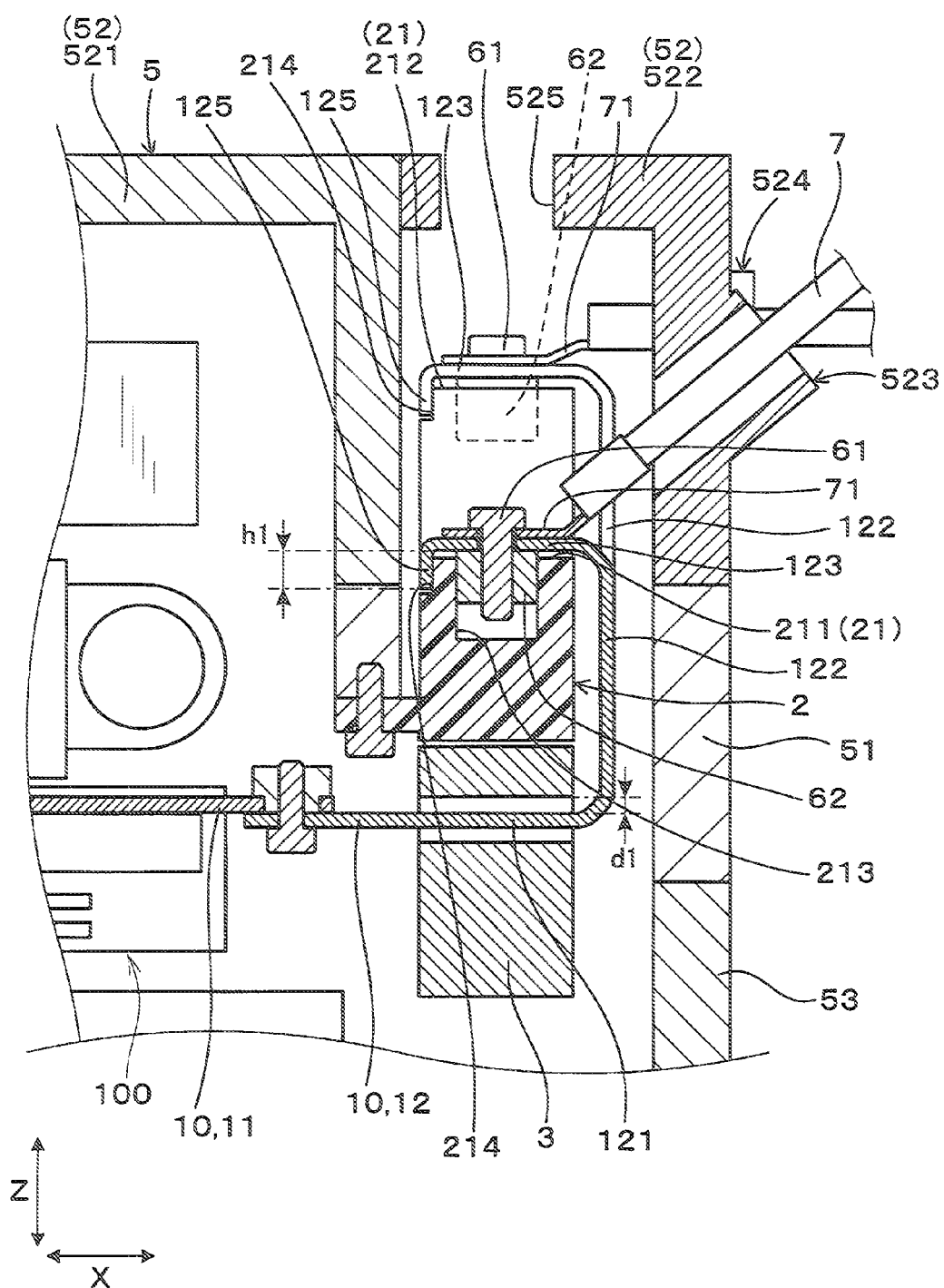
FIG. 5 is a partial cross-sectional view showing a power converter according to a second embodiment of the present invention.
Figure 6:
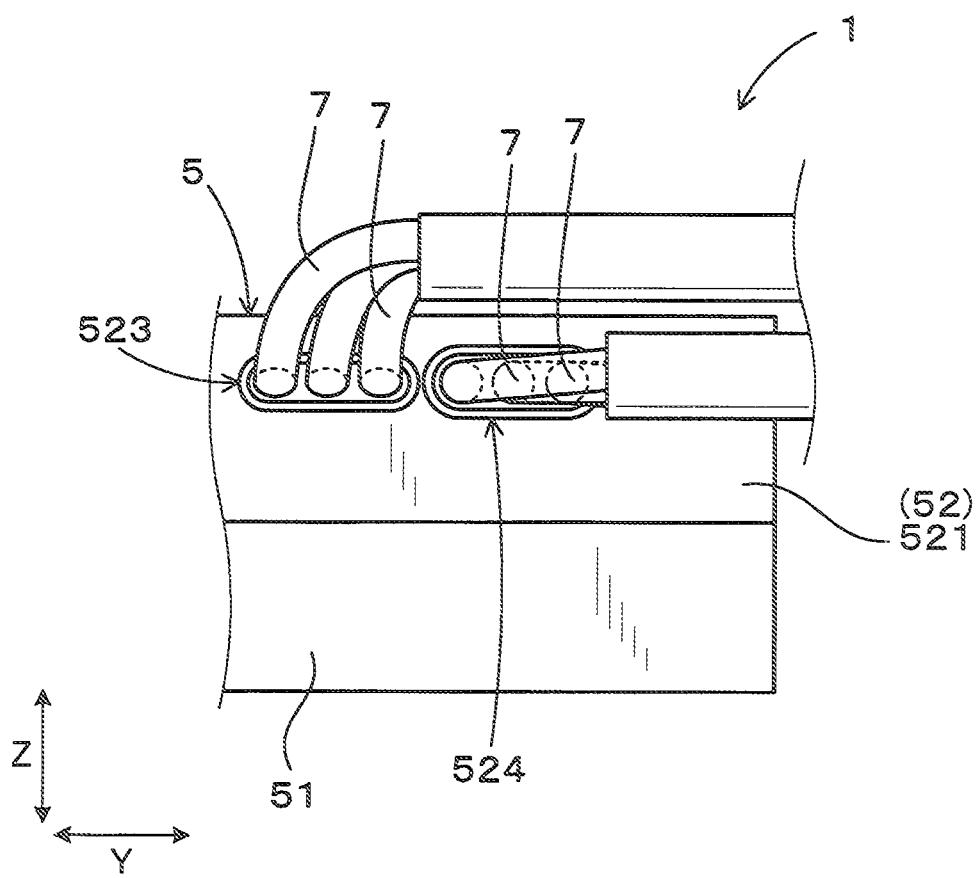
FIG. 6 is an elevation view showing a plurality of wires which are connected in the power converter according to the second embodiment.
Figure 7:
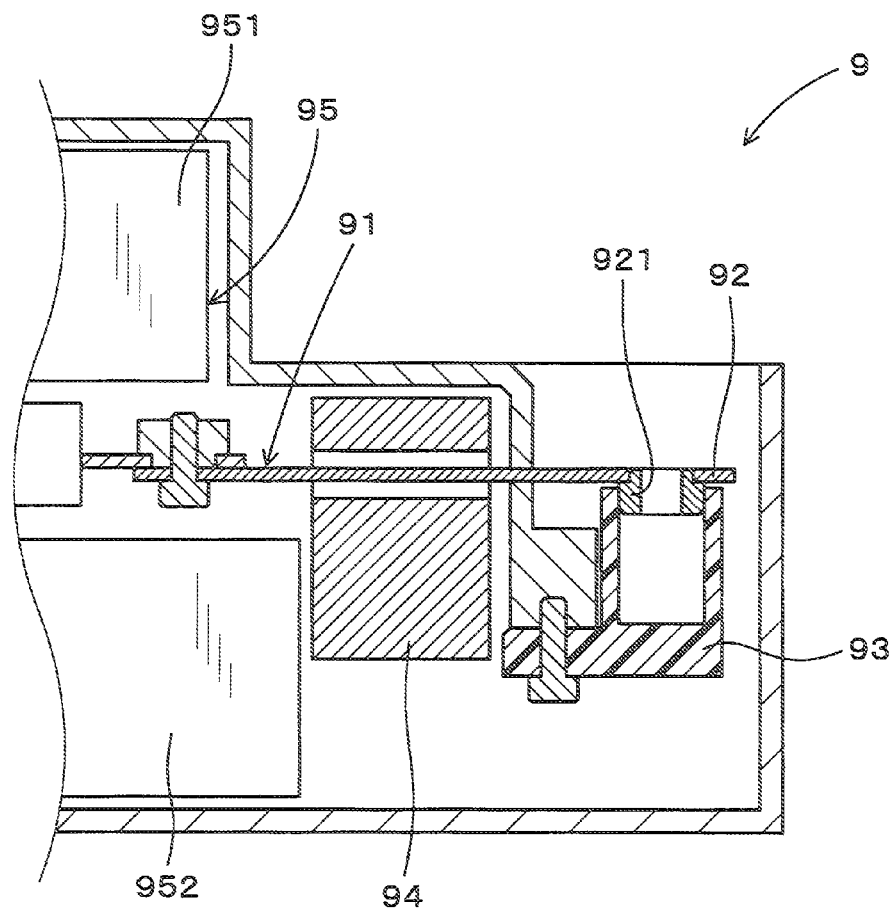
FIG. 7 is a cross-sectional view showing a power converter according to an related art.

Next, with reference to FIGS. 5 and 6, a second embodiment is described. In the present embodiment, the components identical with or similar to those in the first embodiment are given the same reference numerals for the sake of omitting unnecessary explanation. Compared to the above first embodiment, the present embodiment changes the shape of the power bus bar 10 and the shape of the terminal block 2.

As shown in FIG. 5, the power bus bar 10 includes an engaging claw 125 which is vertically arranged to the side of the first and second mounting surfaces 211 and 212. The engaging claw 125 is located at an end portion on the opposite side of the outer surface faced portion 122 in the terminal portion 123.

In the engaging claw 125, a vertical height h1 in the height direction Z is set to be larger than a distance d1 in the height direction Z between the current sensor 3 and the sensor-surrounded portion 121 on the side of the mounting surface 21.

In the terminal portion 123 of the power bus bar 10, the press-fit nut 124 is not provided, but a bolt insertion hole in which a fixing bolt 61 is inserted is formed.

In the terminal block 2, an engaging groove 215 with which the engaging claw 125 of the power bus bar 10 can be engaged is formed at a position corresponding to the engaging claw 125. In the present embodiment, the engaging groove 215 is formed in the terminal block 2, but the engaging claw 125 can be engaged with an end surface located at the side of the engaging claw 125 in the terminal block 2.

The concave groove portion 213 formed in the terminal block 2 has an inner surface with a shape corresponding to a outer shape of a nut 62, which comprises a separate body, into which the fixing bolt 61 can be screwed. The concave groove portion 213 is designed so that the nut 62 is inserted therein.

The first connection port 523 of the terminal block side cover 522 has an opening portion that is located to an outside thereof. The opening portion of the first connection port 523 is formed so as to be inclined upwardly outside in such a manner that the height position of the first connection port 523 is substantially identical to that of the second connection port 524.

The other configuration is the same as the first embodiment.

In the present embodiment, the power bus bar 10 includes the engaging claw 125 that is vertically arranged to the side of the mounting surface 21 at the end portion of the opposite side of the outer surface faced portion 122 in the terminal portion 123. The engaging claw 125 is engaged with the terminal block 2. This can easily assemble the terminal block 2.

Here, the terminal block 2 may be assembled under the condition that the terminal block 2, the power bus bar 10, and the current sensor 3 have been assembled previously.

In this case, the power bus bar 10 is not fixed to the terminal block 2. Due to this, if there is no engaging claw 125, the power bus bar 10 is likely to fall off when inclined. In the present embodiment, the power bus bar 10 is provided with the engaging claw 125, and the engaging claw 125 is engaged with the terminal block 2. This can prevent the power bus bar 10 from falling off, thereby improving workability of assembly of the terminal block 2 in an assembled state of the terminal block 2, the power bus bar 10, and the current sensor 3.

In the engaging claw 125, the vertical height h1 in the height direction Z, which is a direction in which the current sensor 3 and the terminal block 2 are arranged, is set to be larger than a distance d1 in the height direction Z between the current sensor 3 and the sensor-surrounded portion 121 on the side of the mounting surface 21.

Here, a moving amount in the height direction Z of the power bus bar 10 is determined by a distance between the current sensor 3 and the sensor-surrounded portion 121. Therefore, the vertical height h1 is set as described above (h1>d1), thereby being able to more reliably prevent the power bus bar 10 from falling off.

In addition, as shown in FIGS. 5 and 6, the height position of the first mounting surface 211 is set to be lower than that of the second mounting surface 212, so that a space is formed on the upper side of the first mounting surface 211. Using this space can improve the degree of freedom of connecting and routing the wires 7 that are connected to the terminal portion 123 located on the first mounting surface 211.

In the present embodiment, as shown in FIGS. 5 and 6, the wires 7 which are inserted in the first connection port 523 is inclined upward by using the above space, and then, can be located at the upside of the wires 7 which are inserted in the second connection port 524 without being forcedly bent.

The power converter 1 as described above is connected to the three-phase AC rotating electrical machine as an external load, but is not limited to this configuration. The power converter may be configured depending on several external loads. In this case, the number of terminal portions located in the connection port may be associated with the external load.

The number of the external road is not limited to two, but may be one or more. That is, the power converter may be configured so as to be connectable to one or more external loads.

In the power converter, the power bus bar may include a nut which is fixed to a surface on the side of the terminal block in the terminal portion. A concave groove portion may be formed on the mounting surface in the terminal block. The concave groove portion may have a shape corresponding to an outer shape of the nut. The nut may be inserted in the concave groove portion.

In this case, the nut is fitted in the concave groove portion, so that the nut can be positioned. Thus, the terminal portion to which nut is fixed can be positioned, thereby being able to improve workability on connecting the terminal portion and the external device.

In the power converter, the power bus bar may further include an engaging claw that is vertically arranged to the side of the mounting surface at an end portion on the opposite side of the outer surface faced portion in the terminal portion. The engaging claw may be engaged with the terminal block.

In this case, the terminal block can be easily assembled. Here, the terminal block may be assembled under the condition that the terminal block, the power bus bar, and the current sensor have been assembled. In this case, the power bus bar is not fixed to the terminal block. Due to this, if there is no engaging claw, the power bus bar is likely to fall off when inclined. In contrast, the power bus bar is provided with the engaging claw, and the engaging claw is engaged with the terminal block. This can prevent the power bus bar from falling off, thereby improving workability of assembly of the terminal block in an assembled state of the terminal block, the power bus bar, and the current sensor.

In the power converter, a vertical height in a height direction, which is an arrangement direction where the current sensor and the terminal block are arranged, may be set to be larger than a distance in the height direction between the current sensor and the sensor-surrounded portion on the side of the mounting surface.

Here, a moving amount in the height direction of the power bus bar is determined by a distance between the current sensor and the sensor-surrounded portion. Therefore, the vertical height is set as described above, thereby more reliably preventing the power bus bar from falling off.

In the power converter, the mounting surface may include a first mounting surface and a second mounting surface. A height position of the first mounting surface in a height direction, which is an arrangement direction where the current sensor and the terminal block are arranged, may be set to be lower than that of the second mounting surface.

This can reduce a space for providing the plurality of wires connected to the first and second mounting surfaces. That is, the height positions of the first and second mounting surfaces are changed so that the plurality of wires, which are connected to the terminal portion located in the respective mounting surfaces, can be arranged side by side in the height direction. Due to this, the plurality of wires are not overlapped with each other, thereby being able to prevent the plurality of wires from bulging outward. This can reduce the space required for housing the plurality of wires.

In addition, the height position of the first mounting surface is set to be lower than that of the second mounting surface, so that a space is formed on the upper side of the first mounting surface. Using this space can improve the degree of freedom of connecting and routing wires of a connector that is connected to the terminal portion located in the first mounting surface.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A power converter comprising:
a power conversion section that configures a circuit for power conversion;
a power bus bar that extends from the power conversion section in a first direction, the power bus bar including a terminal portion;
a terminal block that is arranged side by side with the power conversion section in the first direction at a side in which the power bus bar is extended from the power conversion section, the terminal block including a mounting surface to which the terminal portion of the power bus bar is mounted, a bottom surface on an opposite side of the mounting surface, and an outer surface on an opposite side of the power conversion section, the mounting surface and the bottom surface being parallel to the first direction, the outer surface being parallel to a second direction perpendicular to the first direction;
a current sensor that measures current flowing in the power bus bar, wherein:
the mounting surface faces the second direction perpendicular to the first direction in which the power conversion section and the terminal block are arranged;
the current sensor is arranged side by side with the terminal block in the second direction at a side of the bottom surface of the terminal block;
the power bus bar further includes a sensor-surrounded portion surrounded by the current sensor and an outer surface faced portion located between the sensor-surrounded portion and the terminal portion along the outer surface of the terminal block in the second direction; and
the power bus bar is formed into a U-like shape by the sensor-surrounded portion, the outer surface faced portion, and the terminal portion in such a manner that the sensor-surrounded portion faces the bottom portion of the terminal block in the second direction, the outer surface faced portion faces the outer surface of the terminal block in the first direction, the terminal portion faces the mounting surface of the terminal block in the second direction, and the terminal block is located inside the U-like shape of the power bus bar.

2. The power converter according to claim 1, wherein:
the power bus bar includes a nut that is secured to a surface on the side of the terminal block in the terminal portion;
a concave groove portion is formed on the mounting surface in the terminal block, the concave groove portion having a shape corresponding to an outer shape of the nut; and
the nut is inserted in the concave groove portion.

3. The power converter according to claim 1, wherein:
the power bus bar further includes an engaging claw that is vertically arranged to the side of the mounting surface at an end portion on the opposite side of the outer surface faced portion in the terminal portion; and
the engaging claw is engaged with the terminal block.

4. The power converter according to claim 2, wherein:
the power bus bar further includes an engaging claw that is vertically arranged to the side of the mounting surface at an end portion on the opposite side of the outer surface faced portion in the terminal portion; and
the engaging claw is engaged with the terminal block.

5. The power converter according to claim 3, wherein
in the engaging claw, a vertical height in a height direction, which is the second direction where the current sensor and the terminal block are arranged, is set to be larger than a distance in the height direction between the current sensor and the sensor-surrounded portion on the side of the mounting surface.

6. The power converter according to claim 4, wherein
in the engaging claw, a vertical height in a height direction, which is the second direction where the current sensor and the terminal block are arranged, is set to be larger than a distance in the height direction between the current sensor and the sensor-surrounded portion on the side of the mounting surface.

7. The power converter according to claim 1, wherein:
the mounting surface comprises two or more mounting surfaces including a first mounting surface and a second mounting surface; and
a height position of the first mounting surface in a height direction, which is the second direction where the current sensor and the terminal block are arranged, is set to be lower than a height position of the second mounting surface.

8. The power converter according to claim 2, wherein:
the mounting surface comprises two or more mounting surfaces including a first mounting surface and a second mounting surface; and
a height position of the first mounting surface in a height direction, which is the second direction where the current sensor and the terminal block are arranged, is set to be lower than a height position of the second mounting surface.

9. The power converter according to claim 3, wherein:
the mounting surface comprises two or more mounting surfaces including a first mounting surface and a second mounting surface; and
a height position of the first mounting surface in a height direction, which is the second direction where the current sensor and the terminal block are arranged, is set to be lower than a height position of the second mounting surface.

10. The power converter according to claim 4, wherein:
the mounting surface comprises two or more mounting surfaces including a first mounting surface and a second mounting surface; and
a height position of the first mounting surface in a height direction, which is the second direction where the current sensor and the terminal block are arranged, is set to be lower than a height position of the second mounting surface.

11. The power converter according to claim 5, wherein:
the mounting surface comprises two or more mounting surfaces including a first mounting surface and a second mounting surface; and
a height position of the first mounting surface in a height direction, which is the second direction where the current sensor and the terminal block are arranged, is set to be lower than a height position of the second mounting surface.

12. The power converter according to claim 6, wherein:
the mounting surface comprises two or more mounting surfaces including a first mounting surface and a second mounting surface; and
a height position of the first mounting surface in a height direction, which is the second direction where the current sensor and the terminal block are arranged, is set to be lower than a height position of the second mounting surface.

* * * * *